United States Patent

Lawlor et al.

[11] 3,797,132
[45] Mar. 19, 1974

[54] EDUCATIONAL DEVICE

[75] Inventors: John E. Lawlor, Tappan, N.Y.; John Sgombick, Ramsey, N.J.

[73] Assignee: Xerox Corporation, Stamford, Conn.

[22] Filed: Nov. 22, 1972

[21] Appl. No.: 308,864

[52] U.S. Cl. .................................. 35/19 R
[51] Int. Cl. ............................... G09b 23/16
[58] Field of Search ........................ 35/19 R

[56] References Cited
OTHER PUBLICATIONS

Welch Scientific Apparatus and Supplies Catalog 1965 page 161, Mechanical-Equivalent-of-Heat Apparatus, Cavendish Form.

*Primary Examiner*—Harland S. Skogquist

[57] ABSTRACT

A simple, durable, inexpensive educational device for demonstrating the variables affecting heat production especially adapted for use by educational institutions below the college level is described. The device comprises a base member, a chamber for containing a supply of a liquid, means for securing the chamber to the base member, a thermally conductive metal insert and a thermometer. Included are means on the chamber for holding the metal insert and the thermometer in contact with a supply of liquid. Means are included for rubbing the metal insert.

12 Claims, 3 Drawing Figures

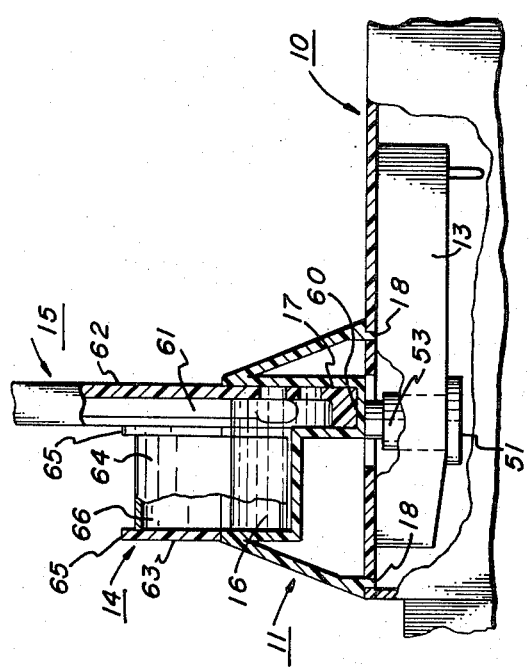
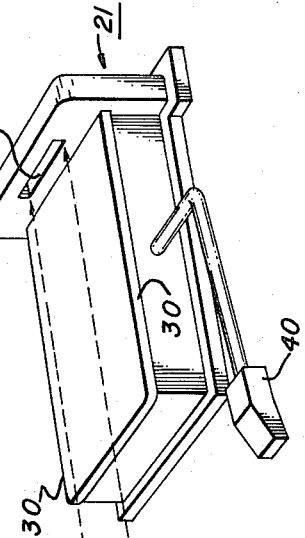
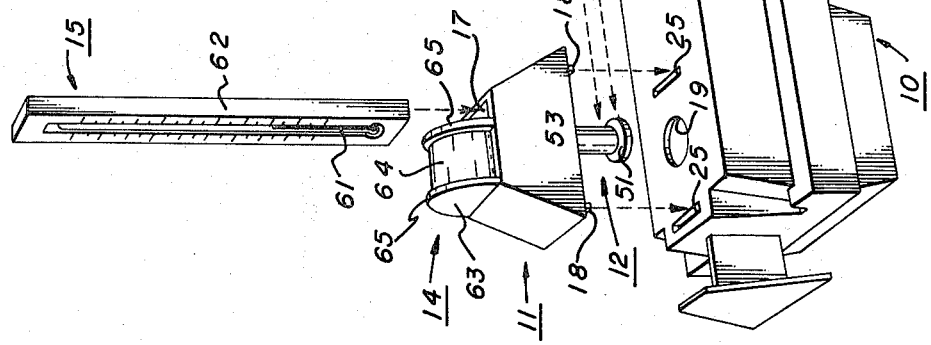

3,797,132

EDUCATIONAL DEVICE

BACKGROUND OF THE DISCLOSURE

I. Field of the Invention

This invention relates to educational devices, and more particularly to an educational device for demonstrating variables affecting heat production, referred to as a heat generating device.

II. Description of the Prior Art

As an educational device, the heat generating device is a fundamental tool for the teaching of many principles in learning institutions below the college level. For example, a student is given an opportunity to perform independently the complete sequence of behaviors involved in experimenting: constructing a hypothesis, interpreting data from the test, describing how the data support or do not support the hypothesis and, if necessary, revising the hypothesis and testing it again. Numerous efforts have been made to construct simple, relatively inexpensive, rugged, easily assembled and relatively portable educational devices of the type described. Examples of some efforts in this area are typified by U.S. Pat. Nos. 257,729, 2,090,873, 2,326,194 and 2,745,195. The devices described therein, although satisfactory in some respects, do not possess the combined advantages of being relatively inexpensive, rugged, easily assembled and relatively portable when compared to the novel and advantageous device of the present invention.

SUMMARY OF THE INVENTION

It is therefore an object of the present invention to overcome the disadvantages stated hereinabove and to provide an educational device which is simpler, more durable, less expensive, more easily assembled and still more pleasing from a design viewpoint than prior art devices, and otherwise more suitable for use in learning institutions below the college level.

It is a further object of the present invention to provide an educational device for demonstrating the variables affecting heat production.

It is a further object of this invention to provide an educational device which is compact when assembled.

It is a further object of this invention to provide an educational device which is quickly disassembled for easy storage in a very small space.

It is a further object of this invention to provide an educational device which does not require a single grommet, screw, bolt, rivet or similar fastening type connection.

It is still a further object of this invention to provide an educational device which, in addition to its educational features and many mechanical advantages, possesses a pleasing design.

The foregoing objects and others are accomplished in accordance with the present invention by providing an educational device comprising a base member, a chamber for containing a supply of a liquid, means for securing the chamber to the base member, a thermally conductive metal insert, a thermometer, and means on the chamber for holding the metal insert and the thermometer in contact with a supply of liquid.

BRIEF DESCRIPTION OF THE DRAWINGS

For a better understanding of the invention, as well as other objects and further features thereof, reference is made to the following detailed disclosure of this invention taken in conjunction with the accompanying drawings wherein:

FIG. 1 is a perspective view of individual parts of an educational device in accordance with the invention illustrating how the parts are assembled;

FIG. 2 is a partial breakaway side view of the educational device; and

DESCRIPTION OF THE PREFERRED EMBODIMENTS

Figure 3:
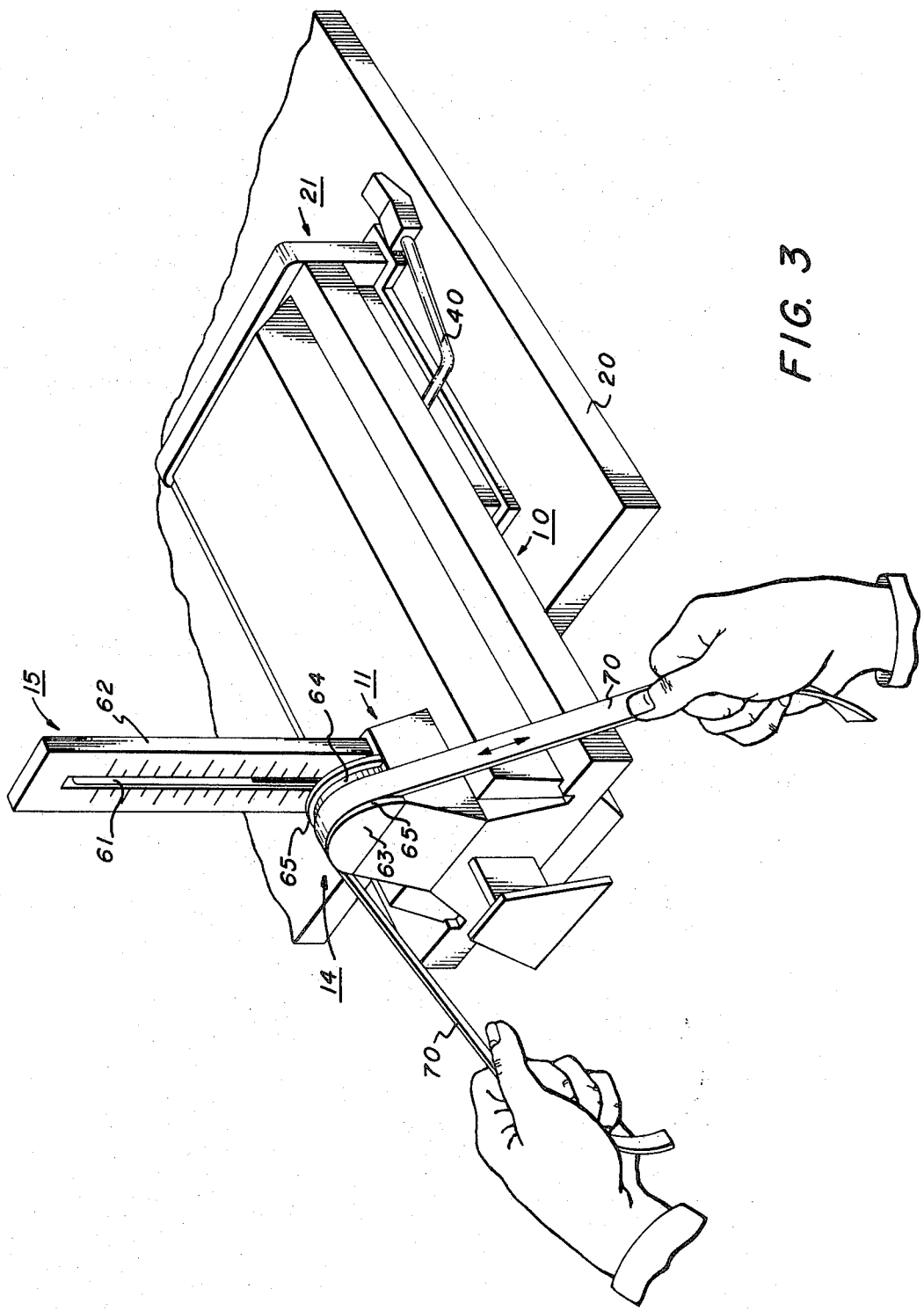
FIG. 3 is a perspective view of an educational device in accordance with the invention affixed to a supporting surface.

Referring now to FIG. 1, the educational device in accordance with the features of this invention is shown to comprise a base member 10 designed in a manner which permits various parts of the device to be easily secured thereto. Releasably secured to the base member 10 is a chamber 11 which is designed to contain a supply of a liquid. Means in the form of a locking flange 12 extending from the bottom portion of the chamber 11, and a locking device 13, are used to firmly secure the chamber to the base member 10. A thermally conductive metal insert 14 is employed for the purpose of transmitting heat to the supply of liquid in the chamber by mechanical means. Also provided is a thermometer 15 which is used to allow the student to visually record any difference in the temperature of the liquid. Means in the form of two separate chambers 16 and 17 located in chamber 11, as best shown in FIG. 2, firmly hold the metal insert 14 and the thermometer 15 in contact with a supply of liquid in chamber 11.

The educational device described herein can be mounted to a support surface 20 as shown in FIG. 3, such as a table, by any of numerous securing or mounting means such as, for example, clamps, etc. One specific example of means for mounting the base member 10 to supporting surface 20 is shown as vacuum mounting means 21. By employing such mounting or securing means, the device is thereby made portable and demountable for movement from location to location as the need arises. When employing the vacuum mounting means, channels (not shown) which are formed in the base member 10 engage extending shoulders 30 (note FIG. 1) of an upper surface of a housing 31 of the vacuum mounting means 21. A tab segment 32 of the base member 10 extends through a window 33 in the vacuum mounting means 21 and engages the window frame for locking the educational device to the vacuum mount. The educational device can be demounted by depressing the tab 32 and simultaneously withdrawing the base 10 from the vaccum mount 21. The educational device is therefore conveniently demountable from the surface 20 by rotation of a lever arm 40 which operates to release the vacuum. A vacuum mount of this type is shown and described in detail and is claimed in corresponding U.S. Pat. application Ser. No. 144,934 filed May 19, 1971 and which is assigned to the assignee of this invention.

In assembling the educational device, the vacuum mount 21 is positioned near the edge of a support surface 20, secured thereto, and the base member 10 is connected to the vacuum mount in a locked relationship in the manner described above. As shown in FIG. 1 the chamber 11, including locking flange 12 and tabs 18 all extending from the bottom portion of the chamber, can be attached to the base member 10 by inserting the locking flange through the opening 19 and by simultaneously inserting tabs 18 through openings 25. Openings 19 and 25 are positioned on the upper surface of the base member as shown in FIG. 1. Locking device 13 which includes two substantially parallel arm-like members 50 is then slipped over the substantially circular flange portion 51 of locking flange 12. The arm-like members are spaced from each other at a distance which is sufficient to permit insertion of the elongated tubular portion 53 of locking flange 12 therebetween. An illustration of the chamber 11 firmly secured to base member 10 by this locking means is shown in FIG. 2.

Chamber 11 is designed to comprise an internal receptacle divided into connected compartments or cells 16 and 17 for containing a liquid such as, for example, water. Compartment 17 is designed such that thermometer 15 fits firmly therein resting on bottom portion 60. Thermometer 15 preferably comprises a typical glass bulb thermometer 61 encased in a plastic rectangular housing 62 which includes on its face portion a temperature scale such as, for example, in degrees centigrade.

Firmly inserted within compartment 16 is metal insert 14 comprising support means 63 upon which rests conductive metal strip 64. Support means 63 comprises semicircular wall portion 65 connected by member 66. The metal strip is preferably formed of a strip of heat conductive metal formed into a U-shape such that the top portion is supported by member 66 while the two leg members of the U-shape extends into the bottom portion of compartment 16 as shown in FIG. 2. The width of the metal insert is preferably sufficient to extend substantially the complete distance between wall portions 65. Compartment 16 includes an upstanding tab (not shown) which inserts within a hole (not shown) in member 66 to firmly support metal insert 14 within the compartment.

The thermally conductive metal strip 64 is formed of any suitable metal or alloy which is a good conductor of heat. Examples of some of the preferred metals and alloys which are eminently suitable include copper, brass, bronze, etc.

In accordance with the present invention, various suitable materials may be used for manufacturing the various parts of the educational device herein described. However, in accordance with the preferred embodiments of this invention, the base member 10, chamber 11 including locking flange 12, locking device 13 and support means 63 are all preferably constructed of plastic.

The educational device of the present invention is designed to allow the student to produce heat in such a way that the heat can be measured. For example, the student can produce heat mechanically and measure the heat produced by placing both the metal strip 64 and the thermometer 15 in contact with a measured quantity of a liquid such as, for example, two milliliters of water. The liquid, which can be any of numerous types of liquids, is poured into chamber 11 and thereby fills both compartments 16 and 17 to the desired level. The amount of liquid added to chamber 11 can vary, but should be sufficient to insure that the bulb portion of thermometer 15 and the bottom portions of metal strip 64 are immersed therein. The U-shape of metal strip 64 enables the student to heat it mechanically as shown in FIG. 3 by rubbing the metal strip with a strap 70. The strap can be formed of numerous materials such as, for example, leather. However, in accordance with the present invention other means can be used to rub the metal insert and heat it mechanically such as, for example, emery cloth, sandpaper, shoelaces, a clothesline, etc. Upon rubbing the metal strip, the metal conducts the heat formed by the rubbing to the liquid, and the liquid's rise in temperature is shown on the thermometer 15. The temperature rise is a measure of the heat produced mechanically by rubbing and this can be observed by the student.

The educational device of the present invention is designed to permit considerable freedom for the students to identify and change various variables and test several hypotheses of the above described experiment such as, for example, the following:

1. The faster the student moves the strap 70 back and forth, the greater the heat produced;
2. The harder the student pulls down on the strap (as it is moved back and forth), the greater the heat produced;
3. The longer the stroke, the greater the heat produced;
4. The greater the number of strokes, the greater the heat produced;
5. Two straps side by side will produce more heat than a single strap. (The wider the strap, the greater the heat.)
6. If the student varies both the length of the stroke and the speed of the stroke but keeps the product length of stroke X speed of stroke constant, the amount of heat produced will remain constant;
7. The greater the amount of liquid used, the longer the time required to increase the temperature.

The educational device described herein can also be used to measure heat from a chemical reaction. In this activity the students can produce heat in several ways, e.g., by dissolving a salt in water, and by mixing an acid with a base. In regard to the first of these experiments, it should be noted that most salts produce temperature changes when they are dissolved in water. Sometimes the effect is that the mixture gets cooler and sometimes hotter. Therefore, students have the opportunity to observe both the increase and decrease of temperature due to a chemical reaction. Here, for example, hydrated copper sulfate when dissolved in water in chamber 11 can be used to produce a small decrease in temperature as recorded on thermometer 15. On the other hand, anhydrous copper sulfate can be used to illustrate an increase in temperature of the solution as it dissolves. Regarding the second of these experiments, when a solution of an acid reacts with a base, the final temperature of the mixture is usually higher than the initial temperature of the two solutions. Here students can observe the changes in temperature by mixing, for example, acids such as dilute acetic acid (vinegar) or citric acid solution with household ammonia.

In both of the above described experiments there is considerable freedom for the students to identify and change various variables. For example, in the first experiment, the mass of the salt and the volume of water can be changed. In the second experiment the amount of acid, the amount of base and the amount of water added to the acid and base mixture can be identified and changed to obtain either smaller or larger changes in temperature.

Various types of experiments which can be performed by students using the educational device of this invention are explained in detail in "Science — A Process Approach/Part G, Variables Affecting Heat Production" published by the American Association for the Advancement of Science.

While we have illustrated and described a particular embodiment of our invention, it will be understood that various modifications may be made therein without departing from the spirit of the invention and the scope of the appended claims.

We claim:

1. An educational device comprising a base member; a chamber for containing a supply of a liquid; means for securing said chamber to said base member, a thermally conductive metal insert, a thermometer, and means on said chamber for holding said metal insert and said thermometer in contact with said liquid.

2. An educational device according to claim 1 further including means for rubbing said metal insert.

3. An educational device according to claim 2 wherein said rubbing means is an elongated leather strap.

4. An educational device according to claim 1 wherein said liquid is water.

5. An educational device according to claim 1 wherein said means for securing said chamber to said base member comprises a locking flange extending from said chamber and a locking device releasably secured to said locking flange.

6. An educational device according to claim 5 wherein said locking flange includes an elongated tubular portion connected at one end to a bottom portion of said chamber and a substantially circular flange at the opposite end thereof.

7. An educational device according to claim 5 wherein said locking device includes two substantially parallel arm-like members connected at one end thereof, said arm-like members being spaced from each other at a distance sufficient to permit insertion of said locking flange therebetween.

8. An educational device according to claim 5 wherein the bottom portion of said chamber includes said locking flange and two tabs extending therefrom.

9. An educational device according to claim 8 wherein said base member includes openings for insertion of each of said tabs and said flange.

10. An educational device according to claim 1 wherein said means for holding said metal insert and said thermometer comprises two connected compartments within said chamber.

11. An educational device according to claim 1 wherein said metal insert includes a support means and a U-shaped strip of metal releasably secured to said support means.

12. An educational device according to claim 1 wherein said metal is brass.

* * * * *